(12) United States Patent
Zhu (10) Patent No.: US 10,785,367 B2
(45) Date of Patent: Sep. 22, 2020

(54) AUDIO PROCESSING METHOD AND TERMINAL DEVICE

(71) Applicant: HUAWEI TECHNOLOGIES CO., LTD., Shenzhen, Guangdong (CN)

(72) Inventor: Yongkang Zhu, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/345,969

(22) PCT Filed: Oct. 31, 2016

(86) PCT No.: PCT/CN2016/103952
§ 371 (c)(1),
(2) Date: Apr. 29, 2019

(87) PCT Pub. No.: WO2018/076324
PCT Pub. Date: May 3, 2018

(65) Prior Publication Data
US 2020/0059549 A1 Feb. 20, 2020

(51) Int. Cl.
*H04M 1/72* (2006.01)
*H04R 3/00* (2006.01)
(Continued)

(52) U.S. Cl.
CPC .......... *H04M 1/72569* (2013.01); *H04M 1/03* (2013.01); *H04M 1/6008* (2013.01);
(Continued)

(58) Field of Classification Search
CPC .......... H04R 3/00; H04R 3/002; H04R 3/005; H04M 1/03; H04M 1/60; H04M 1/605;
(Continued)

(56) References Cited

U.S. PATENT DOCUMENTS

| 2002/0068537 A1* | 6/2002 | Shim | H04M 1/605 |
| | | | 455/177.1 |
| 2006/0133623 A1* | 6/2006 | Amir | H04R 3/00 |
| | | | 381/92 |

(Continued)

FOREIGN PATENT DOCUMENTS

| CN | 101909116 A | 12/2010 |
| CN | 102638601 A | 8/2012 |

(Continued)

OTHER PUBLICATIONS

Extended European Search Report issued in European Application No. 16920364.3 dated Oct. 9, 2019, 9 pages.

(Continued)

*Primary Examiner* — Thang V Tran
(74) *Attorney, Agent, or Firm* — Fish & Richardson P.C.

(57) ABSTRACT

The present disclosure relates to audio processing methods and terminal devices. One example method includes determining, by a terminal device, an actual uplink gain based on a position relationship between an acoustic source and a microphone of the terminal device, and processing, by the terminal device, an audio signal from the acoustic source based on the actual uplink gain.

12 Claims, 5 Drawing Sheets

(51) Int. Cl.
*H04M 1/725* (2006.01)
*H04M 1/03* (2006.01)
*H04M 1/60* (2006.01)
*H04R 1/40* (2006.01)

(52) U.S. Cl.
CPC ............ *H04R 1/406* (2013.01); *H04R 3/005* (2013.01); *H04M 2250/12* (2013.01)

(58) Field of Classification Search
CPC .... H04M 1/6008; H04M 1/6016; H04M 1/72; H04M 1/725; H04M 1/27519; H04M 1/72563; H04M 1/72569; H04S 7/30; H04S 7/302
See application file for complete search history.

(56) References Cited

U.S. PATENT DOCUMENTS

| | | | | |
|---|---|---|---|---|
| 2010/0151787 | A1* | 6/2010 | Contreras | ................ H04B 1/44 455/41.2 |
| 2011/0301948 | A1* | 12/2011 | Chen | ....................... G10L 21/02 704/225 |
| 2013/0202130 | A1 | 8/2013 | Zurek et al. | |
| 2013/0202132 | A1* | 8/2013 | Zurek | .................. H04M 1/605 381/107 |
| 2013/0332156 | A1 | 12/2013 | Tackin et al. | |
| 2014/0135058 | A1 | 5/2014 | Sanchez et al. | |
| 2016/0057549 | A1* | 2/2016 | Marquis | ................ H03G 3/344 381/315 |

FOREIGN PATENT DOCUMENTS

| | | |
|---|---|---|
| CN | 103079148 A | 5/2013 |
| CN | 104718794 A | 6/2015 |
| CN | 105376386 A | 3/2016 |
| EP | 2259561 A1 | 12/2010 |
| EP | 2339868 A2 | 6/2011 |
| WO | 2015117919 A1 | 8/2015 |

OTHER PUBLICATIONS

PCT International Search Report and Written Opinion issued in International Application No. PCT/CN2016/103952 dated Jul. 27, 2017, 17 pages (with English translation).

Office Action issued in Chinese Application No. 201680077798.7 dated Jan. 6, 2020, 17 pages (with English translation).

Office Action issued in Chinese Application No. 201680077798.7 dated Jul. 31, 2020, 13 pages (with English translation).

\* cited by examiner

```
A terminal device determines an actual uplink gain
based on a position relationship between an acoustic    ~ S310
   source and a microphone of the terminal device
```

```
The terminal device processes an audio signal from    ~ S320
the acoustic source based on the actual uplink gain
```

AUDIO PROCESSING METHOD AND TERMINAL DEVICE

CROSS-REFERENCE TO RELATED APPLICATIONS

This application is a National Stage of International Application No. PCT/CN2016/103952, filed Oct. 31, 2016, which is hereby incorporated by reference in its entirety.

TECHNICAL FIELD

This application relates to the communications field, and more specifically, to an audio processing method and a terminal device.

BACKGROUND

Currently, an uplink gain of a phone call is fixed, but a gesture of a user on a call using a mobile phone (that is, a gesture of holding the mobile phone) usually changes. In other words, when the user is on a call using the mobile phone, a distance between a microphone (microphone, mic) of the mobile phone and the mouth of the user changes. Therefore, because the uplink gain is fixed, when the mouth is relatively far away from the microphone, loudness of an uplink sound is severely affected. Consequently, user experience is poor.

SUMMARY

Embodiments of this application provide an audio processing method and a terminal device, so as to dynamically adjust an uplink gain to improve user experience.

According to a first aspect, an audio processing method is provided. The method includes: determining, by a terminal device, an actual uplink gain based on a position relationship between an acoustic source and a microphone of the terminal device; and processing, by the terminal device, an audio signal from the acoustic source based on the actual uplink gain.

The terminal device determines the actual uplink gain based on the position relationship between the acoustic source and the microphone of the terminal device, and processes the audio signal from the acoustic source based on the actual uplink gain, so that the terminal device can dynamically adjust an uplink gain based on the position relationship between the acoustic source and the microphone, ensuring loudness of an uplink sound, thereby improving user experience.

In some possible implementations, the determining, by a terminal device, an actual uplink gain based on a position relationship between an acoustic source and a microphone of the terminal device includes: determining, by the terminal device, the actual uplink gain based on a target angle between a plane in which the terminal device is located and a gravity direction.

The terminal device may adjust the actual uplink gain based on an angle between the plane in which the terminal device is located and the gravity direction. For example, the terminal device may adjust, based on a change of the target angle, a value of the actual uplink gain, so as to ensure loudness of the uplink sound, thereby improving user experience.

In some possible implementations, the method further includes: determining, by the terminal device, a first mapping relationship between an uplink gain and an angle between the plane in which the terminal device is located and the gravity direction; where the determining, by the terminal device, the actual uplink gain based on a target angle between a plane in which the terminal device is located and a gravity direction includes: determining, by the terminal device, the actual uplink gain based on the first mapping relationship and the target angle.

The terminal device pre-establishes a correspondence table between an uplink gain and an angle between the plane in which the terminal device is located and the gravity direction. In this way, after determining the target angle, the terminal device may determine, based on the correspondence table, the actual uplink gain corresponding to the target angle, and there is no need to wait for a time to calculate the actual uplink gain corresponding to the target angle, reducing a response time of the terminal device.

In some possible implementations, the determining, by the terminal device, the actual uplink gain based on a target angle between a plane in which the terminal device is located and a gravity direction includes: determining, by the terminal device, the actual uplink gain based on a target angle difference between the target angle and a preset angle.

The terminal device may determine a deviation angle between a standard gesture and a current target angle between the plane in which the terminal device is located and the gravity direction, and then adjust the uplink gain based on a value of the deviation angle.

In some possible implementations, the method further includes: determining, by the terminal device, a second mapping relationship between an uplink gain and an angle difference between the preset angle and the target angle between the plane in which the terminal device is located and the gravity direction; where the determining, by the terminal device, the actual uplink gain based on a target angle difference between the target angle and a preset angle includes: determining, by the terminal device, the actual uplink gain based on the second mapping relationship and the target angle difference.

The terminal device pre-establishes a correspondence table between an angle difference and an uplink gain. In this way, after determining the target angle difference, the terminal device may determine, based on the correspondence table, the actual uplink gain corresponding to the target angle difference.

In some possible implementations, the method further includes: determining, by the terminal device at a first moment, first position information of the plane in which the terminal device is located; determining, by the terminal device, the preset angle based on the first position information; determining, by the terminal device at a second moment, second position information of the plane in which the terminal device is located, where the second moment is later than the first moment; and determining, by the terminal device, the target angle based on the second position information.

The preset angle of the terminal device may vary with a position of the terminal device that occurs when the user is initially on a call (namely, at the first moment).

In some possible implementations, the method further includes: when an angular velocity of the terminal device changes, obtaining, by the terminal device, position information of the plane in which the terminal device is located; and determining, by the terminal device, the target angle based on the position information.

The terminal device may obtain, only when the angular velocity changes, the position information of the plane in which the terminal device is located, so as to determine the target angle, thereby reducing power consumption of the terminal device.

In some possible implementations, the determining, by a terminal device, an actual uplink gain based on a position relationship between an acoustic source and a microphone of the terminal device includes: determining, by the terminal device, the actual uplink gain based on an actual distance between the acoustic source and the microphone.

The terminal device may determine a distance between the microphone and a target acoustic source based on a sound received by the microphone, or may determine an actual distance in another manner.

In some possible implementations, the method further includes: determining, by the terminal device, a third mapping relationship between an uplink gain and a distance between the acoustic source and the microphone of the terminal device; where the determining, by the terminal device, the actual uplink gain based on an actual distance between the acoustic source and the microphone of the terminal device includes: determining, by the terminal device, the actual uplink gain based on the third mapping relationship and the actual distance.

The terminal device may pre-establish the mapping relationship between an uplink gain and a distance between the acoustic source and the microphone of the terminal device, and determine the actual uplink gain based on the mapping relationship when the actual distance is learned, reducing power consumption of the terminal device.

According to a second aspect, a terminal device is provided. The terminal device includes a module configured to perform the method in any one of the first aspect or the possible implementations of the first aspect.

According to a third aspect, a terminal device is provided, including: a processor, a memory, and a communications interface. The processor is connected to the memory and the communications interface. The memory is configured to store an instruction; the processor is configured to execute the instruction; and the communications interface is configured to communicate with another network element under control of the processor. When the processor executes the instruction stored in the memory, the execution enables the processor to perform the method in any one of the first aspect or the possible implementations of the first aspect.

According to a fourth aspect, a storage medium is provided. The storage medium stores program code, and the program code is used to indicate an instruction that is used to perform the audio processing method in any one of the first aspect or the possible implementations of the first aspect.

Based on the foregoing technical solutions, in the embodiments of this application, the terminal device determines the actual uplink gain based on the position relationship between the acoustic source and the microphone of the terminal device, and processes the audio signal from the acoustic source based on the actual uplink gain, so that the terminal device can dynamically adjust an uplink gain based on the position relationship between the acoustic source and the microphone, ensuring loudness of an uplink sound, thereby improving user experience.

BRIEF DESCRIPTION OF DRAWINGS

To describe the technical solutions in the embodiments of this application more clearly, the following briefly describes the accompanying drawings required for describing the embodiments or the prior art. Apparently, the accompanying drawings in the following description show merely some embodiments of this application, and a person of ordinary skill in the art may still derive other drawings from these accompanying drawings without creative efforts.

DESCRIPTION OF EMBODIMENTS

The following clearly and completely describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

In the embodiments of this application, a terminal device may be a device that has a video function, a call function, and/or a recording function, or any other devices that combine recording/call and video functions. This is not limited in the present invention. For example, the terminal device includes, but is not limited to: a mobile phone, a mobile station, a tablet computer, and the like.

A microphone is an energy conversion component that can convert a sound signal into an electrical signal.

Figure 1:
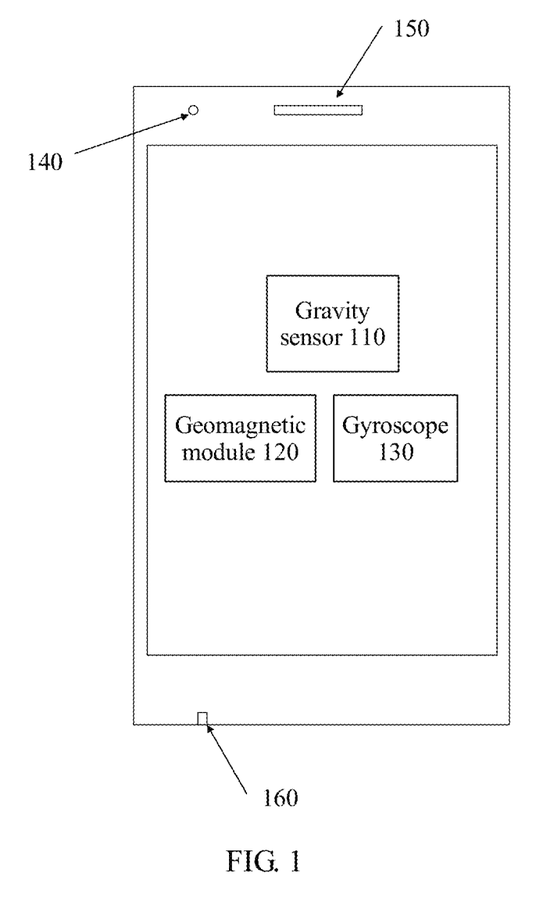
FIG. 1 is a schematic structural diagram of a terminal device according to an embodiment of this application.

FIG. 1 is a schematic structural diagram of a terminal device. The terminal device shown in FIG. 1 includes: a gravity sensor module 110, a geomagnetic module 120, a gyroscope module 130, an infrared distance sensor module 140, an earpiece 150, and a microphone 160. The gravity sensor module 110 may detect a component of a gravity acceleration of the terminal device in each direction of an x-axis, a y-axis, and a z-axis. The geomagnetic module 120 may detect an angle between a geomagnetic direction and a direction of the terminal device on each of the x-axis, the y-axis, and the z-axis. The gyroscope module 130 may detect an angular velocity at which the terminal device moves. The infrared distance sensor module 140 may detect a distance between a human face and the terminal device. The earpiece 150 is configured to receive a sound of a peer end. The microphone 160 is configured to receive a sound produced by a user (that is, a sound of a person using the terminal device).

It should be understood that disposition of each module in the terminal device in FIG. 1 is used as an example, and the disposition of each module may be adjusted and changed based on an actual requirement. This is not limited in this embodiment of this application.

This embodiment of this application may be further applied to a mobile phone with two microphones. A dual-microphone noise reduction technology means that one of two built-in microphones keeps a call stable and clear, and the other microphone actively eliminates noise in a physical manner. Two microphones A and B with same performance are disposed in the mobile phone, where the microphone A is a primary microphone, configured to pick up a sound of a call, and the microphone B is a background sound pickup microphone that is usually installed at the back of the phone and is far away from the microphone A. The two microphones are separated in the mobile phone by a mainboard. During a normal voice call, the mouth close to the microphone A generates a relatively strong audio signal Va, and simultaneously, the microphone B also obtains a voice signal Vb much weaker than A. The two signals are input into a microphone processor. An input end of the microphone processor is a differential amplifier. To be specific, a subtraction operation is performed on the two signals and then the two signals are amplified. As a result, an obtained signal is Vm=Va−Vb. If there is background noise in a use environment, because an acoustic source is far away from the mobile phone, sound waves that arrive at the two microphones of the mobile phone have roughly same intensity, that is, Va≈Vb. Both of the microphones pick up the background noise; therefore, Vm=Va−Vb≈0. Therefore, it can be learned from the foregoing analysis that such a design can effectively resist ambient noise interference surround the mobile phone, thereby improving clarity of the call.

An angle between the mobile phone and a face of the user affects a distance between the mouth and the primary microphone (microphone, mic). A larger angle between the mobile phone and the face of the user results in a larger distance between the mouth and the primary microphone, more severely affecting loudness of an uplink sound, and finally directly causing uplink silence or extremely low loudness of the uplink sound of the call.

Figure 2:
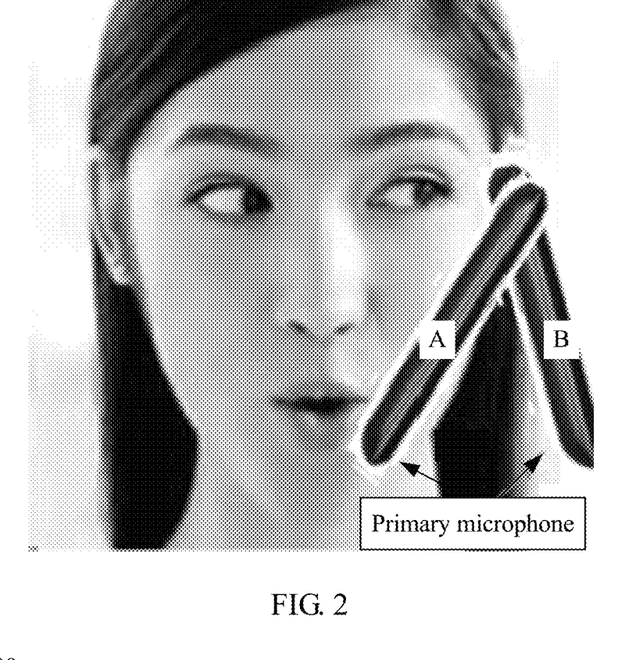
FIG. 2 is a schematic diagram of an application scenario according to an embodiment of this application.

FIG. 2 is a schematic diagram of an application scenario according to an embodiment of this application. As shown in FIG. 2, when a mobile phone angle changes (that is, when the mobile phone moves from a position A to a position B), a distance between the primary microphone and the mouth also changes. In the prior art, an uplink gain of the mobile phone is fixed. In this case, if the distance between the primary microphone and the mouth increases, energy that can be collected decreases.

Figure 3:
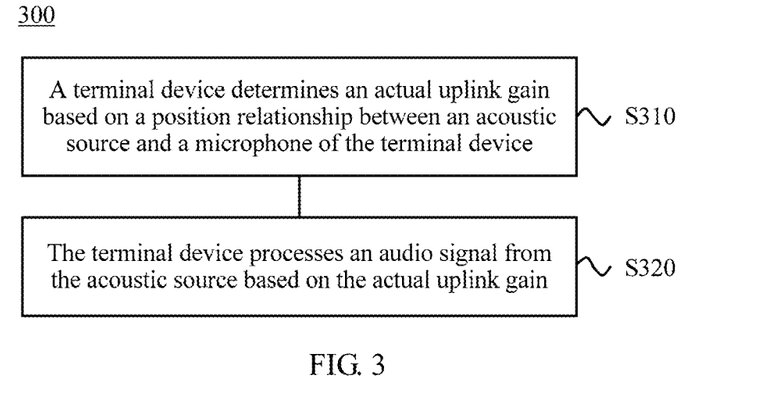
FIG. 3 is a schematic flowchart of an audio processing method according to an embodiment of this application.

FIG. 3 is a schematic flowchart of an audio processing method 300 according to an embodiment of this application. As shown in FIG. 3, the method 300 may be performed by a terminal device. The method 300 includes the following steps:

S310. The terminal device determines an actual uplink gain based on a position relationship between an acoustic source and a microphone of the terminal device.

S320. The terminal device processes an audio signal from the acoustic source based on the actual uplink gain.

The terminal device determines the position relationship between the acoustic source and the microphone of the terminal device, and dynamically adjusts an uplink gain to an appropriate uplink gain (namely, the actual uplink gain) based on the position relationship, for example, increases the uplink gain or decreases the uplink gain, so that the terminal device can process, based on the actual uplink gain, the audio signal received from the acoustic source.

The terminal device may perform audio processing on a target sound to store the target sound. For example, in a recording state, if recording is performed when the mouth is relatively far away from the microphone, the terminal device may enable a recorded sound to be clearly and stably played with proper loudness. Alternatively, when a user is on a call using the terminal device, although the mouth of the user is relatively far away from the microphone, a sound heard by a peer end of the call is clear and stable with proper loudness, thereby improving user experience.

It should be understood that the terminal device in this embodiment of this application may be a terminal device with a single microphone, or may be a terminal device with dual-microphone noise reduction function. When the terminal device has dual-microphone noise reduction function, the microphone in this embodiment of this application is a primary microphone in two microphones. In this case, the terminal device processes, by using the actual uplink gain, an audio signal received by the primary microphone from the acoustic source. In this case, a difference between the processed audio signal received by the primary microphone and an audio signal received by the secondary microphone is not close to zero. In other words, no silence or extremely low loudness of a call resulted from a changing gesture of the user occurs on the terminal device in this embodiment of this application.

Therefore, according to the audio processing method in this embodiment of this application, the terminal device determines the actual uplink gain based on the position relationship between the acoustic source and the microphone of the terminal device, and processes the audio signal from the acoustic source based on the actual uplink gain, so that the terminal device can dynamically adjust an uplink gain based on the position relationship between the acoustic source and the microphone, ensuring loudness of an uplink sound, thereby improving user experience.

Optionally, that the terminal device determines an actual uplink gain based on a position relationship between an acoustic source and a microphone of the terminal device includes: determining, by the terminal device, the actual uplink gain based on an actual distance between the acoustic source and the microphone.

For example, the terminal device may determine a distance between the microphone and a target acoustic source based on a sound received by the microphone, or may determine an actual distance in another manner. This is not limited in this application.

Optionally, in an embodiment, the terminal device may pre-determine, by measuring a plurality of groups of data, a mapping relationship (namely, a third mapping relationship) between an uplink gain and a distance between the acoustic source and the microphone of the terminal device. In other words, the terminal device pre-establishes a correspondence table between an uplink gain and a distance between the acoustic source and the microphone of the terminal device. In this way, after determining a target distance, the terminal device may determine, based on the correspondence table, an actual uplink gain corresponding to the target distance, so that the terminal device can dynamically adjust the uplink gain, ensuring loudness of an uplink sound.

Optionally, the terminal device may further set a preset distance, and determine the actual uplink gain based on a distance difference between the preset distance and the actual distance between the acoustic source and the microphone of the terminal device. The preset distance may be a distance when the user normally uses the terminal device (and may also be referred to as a "standard gesture"). In other words, the terminal device may determine a deviation distance between the standard gesture and a current distance between the acoustic source and the microphone, and then adjust the uplink gain based on the deviation distance, so that the terminal device can dynamically adjust the uplink gain, ensuring loudness of an uplink sound, thereby improving user experience.

It should be understood that the preset distance may be obtained through measurement based on a plurality of groups of data before delivery of the terminal device, and is configured as a default value during delivery. Alternatively, the preset distance may be a value that is manually configured by the user based on a requirement. This is not limited in this application.

Optionally, in an embodiment, that the terminal device determines an actual uplink gain based on a position relationship between an acoustic source and a microphone of the terminal device includes: determining, by the terminal device, the actual uplink gain based on a target angle between a plane in which the terminal device is located and a gravity direction.

Specifically, because a technology used by the terminal device to measure the distance between the target acoustic source and the microphone is not mature, in this embodiment of this application, an angle (namely, the target angle) between the plane in which the terminal device is located and the gravity direction may be used to indicate the position relationship between the acoustic source and the microphone. In this way, the terminal device may adjust the actual uplink gain based on the angle between the plane in which the terminal device is located and the gravity direction. For example, the terminal device may adjust, based on a change of the target angle, a value of the actual uplink gain.

It should be understood that the plane in which the terminal device is located may be any surface of the terminal device, and a plane in which a front surface (for example, a mobile phone screen) of the terminal device is located is used as an example for description in this application.

The structure shown in FIG. 1 is used as an example to describe this embodiment of this application in detail. The terminal device may perceive, by using the infrared distance sensor module 140, whether the terminal device is beside a face, that is, whether the terminal device is in a call-answering state. When the terminal device is in a call-answering state, the gravity sensor module 110 is used to collect gravity acceleration component forces of the terminal device on the three axes, to calculate an angle between the plane in which the terminal device is located and a horizontal plane (that is, perpendicular to the gravity direction)/gravity direction, so that the terminal device may determine a corresponding actual uplink gain based on the angle, and the terminal device may further perform, based on the actual uplink gain, audio processing on a sound received by the microphone 160.

Figure 4:
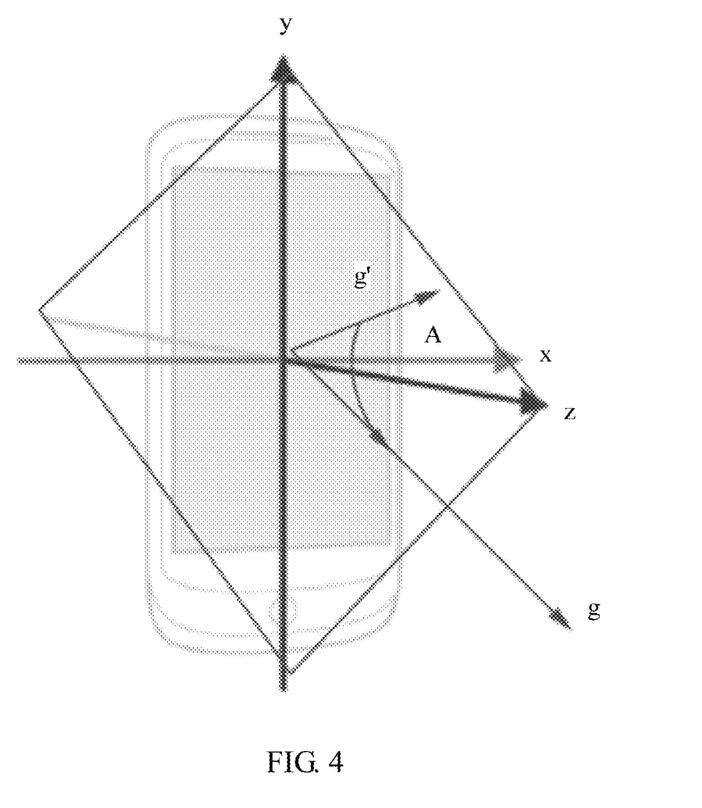
FIG. 4 is a schematic diagram of angle calculation according to an embodiment of this application.

FIG. 4 is used below to specifically describe how the terminal device determines the angle between the plane in which the terminal device is located and the gravity direction. As shown in FIG. 4, an angle change of a mobile phone is simplified and indicated on a plane formed by a y-axis and a z-axis. It is assumed that a sum of vectors of Gy and Gz is g' (that is, a projection of g on the y-z plane), and calculation is simplified and performed on an x-y 2D plane. A deviation angle between g and g' is denoted as A, and A is the angle between the plane in which the mobile phone is located and the gravity direction. A counterclockwise direction is used as a positive direction and a range of A is [0, 2PI], and therefore:

$g'^2 = Gx^2 + Gy^2$ $g' = \text{sqrt}(Gx^2 + Gy^2)$ $A = \arccos(g'/g)$

Optionally, the terminal device may pre-determine, by measuring a plurality of groups of data, a mapping relationship (namely, a first mapping relationship) between an uplink gain and an angle between the plane in which the terminal device is located and the gravity direction. In other words, the terminal device pre-establishes a correspondence table between an uplink gain and an angle between the plane in which the terminal device is located and the gravity direction. In this way, after determining the target angle, the terminal device may determine, based on the correspondence table, the actual uplink gain corresponding to the target angle.

Optionally, in another embodiment, the terminal device may set a preset angle, and determine the actual uplink gain based on an angle difference (namely, a target angle difference) between the preset angle and the target angle between the plane in which the terminal device is located and the gravity direction. The preset angle may be an angle that exists when the user normally uses the terminal device (and may also be referred to as a "standard gesture"). In other words, the terminal device may determine a deviation angle between the standard gesture and the target angle between the plane in which the terminal device is located and the gravity direction, and then adjust the uplink gain based on a value of the deviation angle. It should be noted that the preset angle may vary in different scenarios.

It should be understood that the preset angle may be obtained through measurement based on a plurality of groups of data before delivery of the terminal device, and is configured as a default value during delivery. Alternatively, the preset angle may be a value that is manually configured by the user based on a requirement. This is not limited in this application.

It should be further understood that the terminal device may first determine an uplink gain offset value, and the actual uplink gain is a sum of the offset value and a standard uplink gain. The standard uplink gain may be a default value, or may be a gain before current gain adjustment or an uplink gain corresponding to the standard gesture. This is not limited in this application.

Optionally, the standard gesture of the terminal device may vary with a position of the terminal device that occurs when the user is initially on a call (at a first moment).

For example, for description, the terminal device may further adjust the actual uplink gain based on an angle between a plane perpendicular to the terminal device and the horizontal plane (perpendicular to the gravity direction). As shown in FIG. 4, the terminal device is placed on a horizontal desktop with a screen of the terminal device facing upward; and a right direction is assumed as an x-axis direction, an upward direction is assumed as a y-axis direction, and a direction perpendicular to the terminal device is assumed as a z-axis direction. In this way, the terminal device may determine an initial position of the terminal device based on values of gravity acceleration component forces that are on the three axes and that are detected by the gravity sensor module 110, determine a corresponding standard position based on the initial position, and further determine an angle between a position of the terminal device at a current moment (namely, at a second moment) and the horizontal plane as an angle difference, as shown in Table 1.

TABLE 1

| Initial position | Detection basis | Common gesture | Standard position | Angle difference |
|---|---|---|---|---|
| A mobile phone screen faces upward | A gravity component in the z-axis direction is the largest | An operation is performed when a mobile phone is placed on a desktop | The y-axis direction is consistent with a gravity acceleration direction, and an xoz plane is parallel to the horizontal plane | Angle between the xoz plane and the horizontal plane |
| A mobile phone screen faces downward | A gravity component in a direction reverse to the z-axis direction is the largest | An operation is performed when a user is lying and faces upward | The x-axis direction is consistent with a gravity acceleration direction, and a yoz plane is parallel to the horizontal plane | Angle between the yoz plane and the horizontal plane |
| A mobile phone screen is upright | A gravity component in the y-axis direction is the largest | An operation is performed when a user is half-lying | The y-axis direction is consistent with a gravity acceleration direction, and an xoz plane is parallel to the horizontal plane | Angle between the xoz plane and the horizontal plane |
| A mobile phone screen is upside down | A gravity component in a direction reverse to the y-axis direction is the largest | This gesture is rare | The y-axis direction is consistent with a gravity acceleration direction, and an xoz plane is parallel to the horizontal plane | Angle between the xoz plane and the horizontal plane |
| A mobile phone screen faces sideways | A gravity component in the x-axis direction or a direction reverse to the x-axis direction is the largest | An operation is performed when a user is lying and faces sideways | The z-axis direction is consistent with a gravity acceleration direction, and an xoy plane is parallel to the horizontal plane | The xoy plane is parallel to the horizontal plane |

Optionally, the terminal device may pre-determine a mapping relationship (namely, a second mapping relationship) between an angle difference and an uplink gain by measuring a plurality of groups of data. In other words, the terminal device pre-establishes a correspondence table between an angle difference and an uplink gain. In this way, after determining the target angle difference, the terminal device may determine, based on the correspondence table, the actual uplink gain corresponding to the target angle difference. For example, Table 2 shows a correspondence table between the angle difference in Table 1 and an uplink gain, and certainly, the correspondence is not limited in this application.

TABLE 2

| Angle difference | Uplink gain (It is assumed that a reference is x and is in a unit of dB) |
|---|---|
| ≤−20 | x − 0.6 |
| −10 | x − 0.3 |
| 0 | x |
| 10 | x + 0.3 |
| 20 | x + 0.6 |
| 30 | x + 0.9 |
| 40 | x + 1.2 |
| 50 | x + 1.5 |
| 60 | x + 1.8 |
| ≥70 | x + 2.1 |

Optionally, in an embodiment, the method further includes: when an angular velocity of the terminal device changes, obtaining, by the terminal device, position information of the plane in which the terminal device is located; and determining, by the terminal device, the target angle based on the position information.

Specifically, the terminal device may monitor the angular velocity of the terminal device by using the gyroscope module 130 in FIG. 1. The terminal device may constantly obtain the position information of the plane in which the terminal device is located to determine an angle between the plane and the gravity direction. In this embodiment of this application, the terminal device may obtain, only when the angular velocity changes, the position information of the plane in which the terminal device is located, so as to determine the target angle, thereby reducing power consumption of the terminal device.

For example, the terminal device may not obtain the position information if the angular velocity of the terminal device remains unchanged or the angular velocity is zero, and obtain the position information when detecting that the angular velocity increases or decreases.

Optionally, the terminal device may further set a preset angular velocity threshold. The terminal device obtains, only when detecting that the angular velocity is greater than the preset angular velocity threshold, the position information of the plane in which the terminal device is located.

Therefore, according to the audio processing method in this embodiment of this application, the terminal device determines the actual uplink gain based on the position relationship between the acoustic source and the microphone of the terminal device, and processes the audio signal from the acoustic source based on the actual uplink gain, so that the terminal device can dynamically adjust an uplink gain based on the position relationship between the acoustic source and the microphone, ensuring loudness of an uplink sound, thereby improving user experience.

Figure 5:
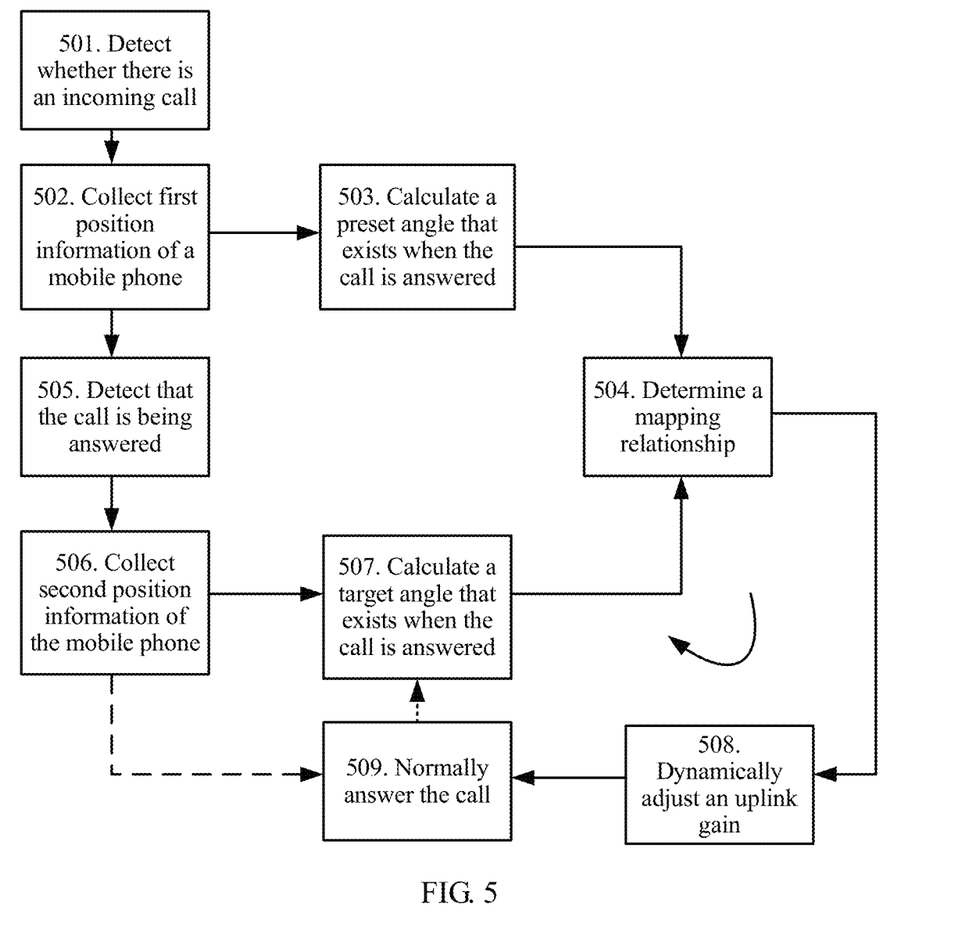
FIG. 5 is a schematic flowchart of an audio processing method according to an embodiment of this application.

FIG. 5 is a detailed flowchart of an audio processing method according to an embodiment of this application. As shown in FIG. 5, a mobile phone is used as an example for description. Meanings of various terms in this embodiment of this application are the same as those in the foregoing embodiments.

It should be understood that this is merely intended to help a person skilled in the art better understand this embodiment of this application, but is not intended to limit the scope of this embodiment of this application.

501. The mobile phone detects whether there is an incoming call.

502. The mobile phone collects first position information of the mobile phone after detecting an incoming call.

503. The mobile phone determines, based on the first position information, a standard gesture (namely, a preset angle between a plane in which the mobile phone is located and a gravity direction) that occurs when the call is answered.

504. The mobile phone determines, based on the standard gesture, uplink gains corresponding to angle differences between different angles and the preset angle (namely, a mapping relationship between an angle difference and an uplink gain).

505. The mobile phone detects that a user answers the call.

Step 505 may be performed before step 502 or after step 504, and this is not limited in this embodiment of this application.

506. The mobile phone collects second position information of the mobile phone after detecting that the user answers the call.

507. The mobile phone calculates, based on the second position information, a target angle between a plane in which the mobile phone is located and the gravity direction.

508. The mobile phone determines, based on the mapping relationships, an actual uplink gain corresponding to an angle difference between the target angle and the preset angle, and adjusts an uplink gain to the actual uplink gain.

509. The mobile phone processes a received user sound (that is, answers the call) based on the actual uplink gain.

It should be understood that in this embodiment of this application, step 507 to step 509 may repeat if a gesture of the user using the mobile phone constantly changes.

Therefore, according to the audio processing method in this embodiment of this application, the terminal device determines a target angle of a current position of the terminal device based on the mapping relationship between an angle difference and an uplink gain, determines, based on the mapping relationship, an actual uplink gain corresponding to a difference between the target angle and the preset angle, and processes an audio signal from an acoustic source based on the actual uplink gain, so that the terminal device can dynamically adjust the uplink gain, ensuring loudness of an uplink sound, thereby improving user experience.

Figure 6:
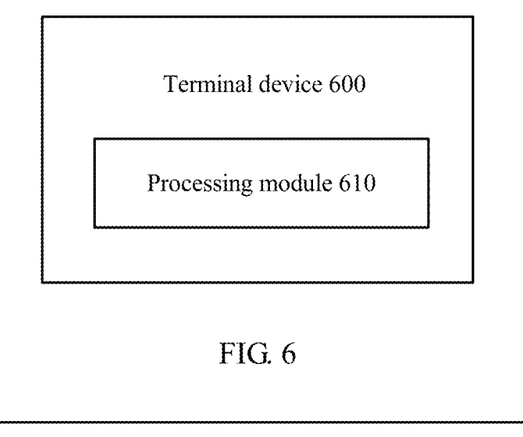
FIG. 6 is a schematic block diagram of a terminal device according to an embodiment of this application.

FIG. 6 is a schematic block diagram of a terminal device 600 according to an embodiment of this application. As shown in FIG. 6, the terminal device 600 includes:

a processing module 610, configured to determine an actual uplink gain based on a position relationship between an acoustic source and a microphone of the terminal device.

The processing module 610 is further configured to process an audio signal from the acoustic source based on the actual uplink gain.

Optionally, the processing module 610 is specifically configured to determine the actual uplink gain based on a target angle between a plane in which the terminal device is located and a gravity direction.

Optionally, the processing module 610 is further configured to determine a first mapping relationship between an uplink gain and an angle between the plane in which the terminal device is located and the gravity direction. The processing module 610 is specifically configured to determine the actual uplink gain based on the first mapping relationship and the target angle.

Optionally, the processing module 610 is specifically configured to determine the actual uplink gain based on a target angle difference between the target angle and a preset angle.

Optionally, the processing module 610 is further configured to determine a second mapping relationship between an uplink gain and an angle difference between the preset angle and the target angle between the plane in which the terminal device is located and the gravity direction. The processing module 610 is specifically configured to determine the actual uplink gain based on the second mapping relationship and the target angle difference.

Optionally, the processing module 610 is further configured to: determine, at a first moment, first position information of the plane in which the terminal device is located; determine the preset angle based on the first position information; determine, at a second moment, second position information of the plane in which the terminal device is located, where the second moment is later than the first moment; and determine the target angle based on the second position information.

Optionally, the processing module 610 is further configured to: when an angular velocity of the terminal device changes, obtain position information of the plane in which the terminal device is located; and determine the target angle based on the position information.

Optionally, the processing module 610 is specifically configured to determine the actual uplink gain based on an actual distance between the acoustic source and the microphone.

Optionally, the processing module 610 is further configured to determine a third mapping relationship between an uplink gain and a distance between the acoustic source and the microphone of the terminal device. The processing module 610 is specifically configured to determine the actual uplink gain based on the third mapping relationship and the actual distance.

Therefore, the terminal device in this embodiment of this application determines the actual uplink gain based on the position relationship between the acoustic source and the microphone of the terminal device, and processes the audio signal from the acoustic source based on the actual uplink gain, so that the terminal device can dynamically adjust an uplink gain based on the position relationship between the acoustic source and the microphone, ensuring loudness of an uplink sound, thereby improving user experience.

Figure 7:
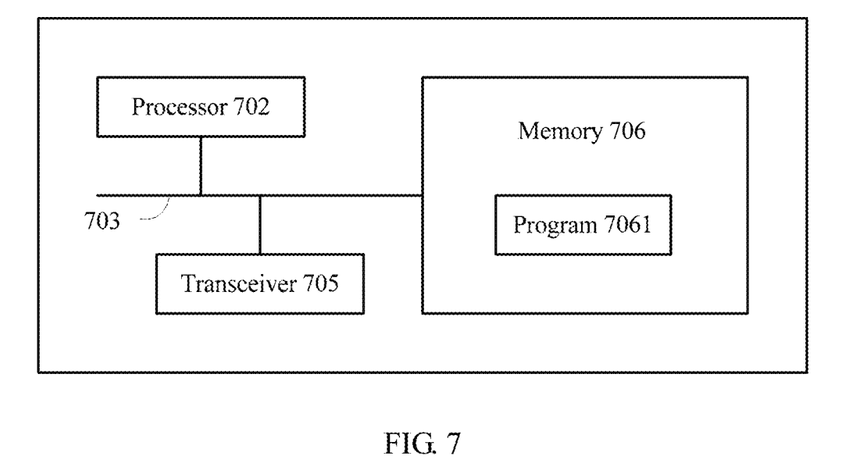
FIG. 7 is a schematic structural diagram of a terminal device according to an embodiment of this application.

FIG. 7 is a schematic structural diagram of a terminal device according to an embodiment of this application. As shown in FIG. 7, the terminal device includes: at least one processor 702 (for example, a general purpose processor CPU with a computing and processing capability, a digital signal processor (DSP), an application-specific integrated circuit (ASIC), or a field programmable gate array (FPGA)). The processor 702 is configured to manage and schedule modules and components in the terminal device. The processing module 610 in the embodiment shown in FIG. 6 may be implemented by using the processor 702. Optionally, the terminal device further includes at least one transceiver 705 (a receiver/transmitter 705), a memory 706, and at least one bus system 703. All components of the terminal device may be coupled together by using the bus system 703. The bus system 703 may include a data bus, a power bus, a control bus, a status signal bus, and the like. For clarity of description, various buses are marked as the bus system 703 in the figure.

Optionally, the processor of the terminal device may further perform a processing procedure by using a gravity sensor module, a geomagnetic module, a gyroscope module, an infrared distance sensor module, an earpiece, a microphone, and the like.

The method disclosed in this embodiment of this application may be applied to the processor 702, or may be used to execute an executable module such as a computer program stored in the memory 706. The memory 706 may include a high-speed random access memory (RAM: Random Access Memory), or may include a non-volatile memory (non-volatile memory). The memory may include a read-only memory and a random access memory, and provide required signaling or data, a required program, or the like to the processor. A part of the memory may further include a non-volatile random access memory (NVRAM).

In some implementations, the memory 706 stores a program 7061, and the processor 702 executes the program 7061, to perform the following operations:

determining an actual uplink gain based on a position relationship between an acoustic source and a microphone of the terminal device; and processing an audio signal from the acoustic source based on the actual uplink gain.

It should be noted that the terminal device may be specifically the terminal device in the embodiment shown in FIG. 6, and may be configured to perform steps and/or procedures corresponding to the terminal device in the method embodiments shown in FIG. 4 and FIG. 5.

It can be learned from the foregoing technical solution provided in this embodiment of this application that the actual uplink gain is determined based on the position relationship between the acoustic source and the microphone of the terminal device, and the audio signal from the acoustic source is processed based on the actual uplink gain, so that the terminal device can dynamically adjust an uplink gain based on the position relationship between the acoustic source and the microphone, ensuring loudness of an uplink sound, thereby improving user experience.

An embodiment of this application further provides a computer storage medium, and the computer storage medium may store a program instruction that is used to indicate any one of the foregoing methods.

Optionally, the storage medium may be specifically the memory 606.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An audio processing method, comprising:
   determining, by a terminal device, an actual uplink gain based on a target angle between a plane in which the terminal device is located and a gravity direction; and
   processing, by the terminal device, an audio signal from an acoustic source based on the actual uplink gain.

2. The method according to claim 1, further comprising:
   determining, by the terminal device, a first mapping relationship between an uplink gain and an angle between the plane in which the terminal device is located and the gravity direction; wherein:
   the determining, by the terminal device, the actual uplink gain based on a target angle between a plane in which the terminal device is located and a gravity direction comprises:
      determining, by the terminal device, the actual uplink gain based on the first mapping relationship and the target angle.

3. The method according to claim 1, wherein the determining, by a terminal device, an actual uplink gain based on a target angle between a plane in which the terminal device is located and a gravity direction comprises:
   determining, by the terminal device, the actual uplink gain based on a target angle difference between the target angle and a preset angle.

4. The method according to claim 3, further comprising:
   determining, by the terminal device, a second mapping relationship between an uplink gain and an angle difference between the preset angle and the target angle between the plane in which the terminal device is located and the gravity direction; wherein:
   the determining, by the terminal device, the actual uplink gain based on a target angle difference between the target angle and a preset angle comprises:
      determining, by the terminal device, the actual uplink gain based on the second mapping relationship and the target angle difference.

5. The method according to claim 3, further comprising:
   determining, by the terminal device at a first moment, first position information of the plane in which the terminal device is located;
   determining, by the terminal device, the preset angle based on the first position information;
   determining, by the terminal device at a second moment, second position information of the plane in which the terminal device is located, wherein the second moment is later than the first moment; and
   determining, by the terminal device, the target angle based on the second position information.

6. The method according to claim 1, further comprising:
   when an angular velocity of the terminal device changes, obtaining, by the terminal device, position information of the plane in which the terminal device is located; and
   determining, by the terminal device, the target angle based on the position information.

7. An apparatus, comprising:
   at least one processor; and
   a non-transitory computer-readable storage medium coupled to the at least one processor and storing programming instructions for execution by the at least one processor, wherein the programming instructions instruct the at least one processor to perform operations comprising:
      determining an actual uplink gain based on a target angle between a plane in which the apparatus is located and a gravity direction; and
      processing an audio signal from an acoustic source based on the actual uplink gain.

8. The apparatus according to claim 7, the operations further comprising:
   determining a first mapping relationship between an uplink gain and an angle between the plane in which the apparatus is located and the gravity direction; wherein:
   the determining the actual uplink gain based on a target angle between a plane in which the apparatus is located and a gravity direction comprises:
      determining the actual uplink gain based on the first mapping relationship and the target angle.

9. The apparatus according to claim 7, wherein the determining an actual uplink gain based on a target angle between a plane in which the apparatus is located and a gravity direction comprises:
   determining the actual uplink gain based on a target angle difference between the target angle and a preset angle.

10. The apparatus according to claim 9, the operations further comprising:
    determining a second mapping relationship between an uplink gain and an angle difference between the preset angle and the target angle between the plane in which the apparatus is located and the gravity direction; wherein:
    the determining the actual uplink gain based on a target angle difference between the target angle and a preset angle comprises:
       determining the actual uplink gain based on the second mapping relationship and the target angle difference.

11. The apparatus according to claim 9, the operations further comprising:
    determining, at a first moment, first position information of the plane in which the apparatus is located;
    determining the preset angle based on the first position information;
    determining, at a second moment, second position information of the plane in which the apparatus is located, wherein the second moment is later than the first moment; and
    determining the target angle based on the second position information.

12. The apparatus according to claim 7, the operations further comprising:

when an angular velocity of the apparatus changes, obtaining position information of the plane in which the apparatus is located; and determining the target angle based on the position information.

* * * * *